United States Patent [19]

Gharavi

[11] Patent Number: 5,200,820
[45] Date of Patent: Apr. 6, 1993

[54] BLOCK-MATCHING MOTION ESTIMATOR FOR VIDEO CODER

[75] Inventor: Hamid Gharavi, Red Bank, N.J.
[73] Assignee: Bell Communications Research, Inc., Livingston, N.J.
[21] Appl. No.: 692,279
[22] Filed: Apr. 26, 1991
[51] Int. Cl.$^5$ .................... H04N 7/18; H04N 7/12
[52] U.S. Cl. ................ 358/105; 358/136
[58] Field of Search ............... 338/105, 135, 136

[56] References Cited

U.S. PATENT DOCUMENTS

| | | | |
|---|---|---|---|
| 4,897,720 | 1/1990 | Wu et al. | 358/136 |
| 4,924,306 | 5/1990 | van der Meer et al. | 358/105 |
| 5,028,995 | 7/1991 | Izawa et al. | 358/105 |
| 5,099,325 | 3/1992 | Artieri | 358/105 |

OTHER PUBLICATIONS

K-M Yang, et al.; "A Family of VLSI Designs for the Motion Compensation Block-matching Algorithms"; IEEE Transactions on Circuits and System; vol. 36, No. 10; Oct. 1989; pp. 1317-1325.
L. De Vos et al.; "Parameterizable VLSI Architectures for the Full-Search Block-Matching Algorithms"; IEEE Transations on Circuits and Systems; vol. 36, No. 10; Oct. 1989; pp. 1309-1316.
C-H Chou et al.; "A VLSI Architectures for Real-Time and Flexible Image Template Matching"; IEEE Transactions on Circuits and Systems; vol. 36, No. 10; Oct. 1989; pp. 1336-1342.
R. C. Kims et al.; "A VLSI Architectures for a Pel Recursive Motion Estimation Algorithms", IEEE Transactions on Circuits and Systems; vol. 36, No. 10; Oct. 1989; pp. 1291-1300.
T. Koga et al.; "Motion-Compensated Interframe Coding for Video Conferencing"; Proceedings of the National Telecommunications Conference; New Orleans, La.; Dec. 1981; G5:3.1-3.5; pp. 63-67.
S. Kappagantual et al. "Motion Compensated Predictive Coding"; SPIE 27th Proc. 432:64-70, 1983; pp. 78-84.
H. G. Musmann, P. Pirsch, H. J. Grallert, "Advances in Picture Coding", *Proceedings of the IEEE*, vol. 72, No. 4, Apr. 1985, pp. 523-548.
R. Plompen et al. "Motion Video Coding in CCITT SG XV-The Video Source Coding" *Proceedings of the IEEE GLOBECOM '88*, pp. 997-1004, Nov., 1988.
T. Komerak, P. Pirsch, "Array Architectures for Block Matching Algorithms", *IEEE Transactions on Circuits and Systems*, vol. 36, No. 10, Oct. 1989, pp. 1301-1308.

*Primary Examiner*—John K. Peng
*Attorney, Agent, or Firm*—Leonard Charles Suchyta; Stephen M. Gurey

[57] ABSTRACT

A method and apparatus (110) for performing block-matching motion estimation in a video coder is disclosed which estimates the motion vector associated with each block of pels in the current coding frame. The motion vector for each block in the current frame is estimated by searching through a larger search window in the previous frame for a best match. At each possible shift position within the search window a pel-by-pel comparison (304) is made between the intensity of the pels in the block in the current frame and the corresponding pels in the previous frame. Each pel is classified as either a matching pel or a mismatching pel depending upon the pel difference and a threshold (306). The number of matching pels at each possible shift position is counted (307) and the motion vector is determined from the shift position that yields the maximum number of matching pels.

14 Claims, 3 Drawing Sheets

BLOCK-MATCHING MOTION ESTIMATOR FOR VIDEO CODER

BACKGROUND OF THE INVENTION

This invention relates to compression coding of video signals, and more particularly to removing the temporal redundancy that exists in video signals by considering the frame-to-frame displacement of moving objects in the coding process.

The main objective in the bandwidth compression of video signals is to remove the vast amount of redundancy which normally exits in the spatial domain (within a frame) as well as in the temporal direction (frame-to-frame). Attempts to minimize the temporal redundancies can be accomplished by interframe coding techniques. In addition, the temporal redundancies can be exploited more efficiently by taking into consideration the displacements of moving objects in the coding process. Thus, in any motion compensated coding scheme, the coding performance depends heavily on the accuracy of the motion estimation.

There are two distint approaches to motion estimation, pel recursive and block-matching (see, e.g., H. M. Musmann, P. Pirsch, and H. J. Gravoert, "Advances in Picture Coding," *Proc. IEEE*, Vol. 73, pp. 523-548, April, 1985). In the former method, motion displacement vectors are recursively estimated to minimize the motion compensated prediction error at each pel instant. In the latter approach, the motion estimation is carried out on a block-by-block basis and due to its lesser hardware complexity, is presently considered the most popular method in digital video applications (see, e.g., R. Plomjen et al., "Motion Video Coding in CCIT SGXV—The Video Source Coding," *Proc. IEEE, GLOBECOM'88*, pp. 997-1004, November, 1988). The main obstacle which has prevented widespread application of motion compensation in real-time video coding, however, is the high computation cost. The evolving ISDN and the growing need for low rate transmission of improved quality video signals at the given ISDN rate (basic rate of 64 kb/s), has promoted the utilization of motion compensated coding. This is in anticipation of the advances in VLSI technology which will facilitate cost effective hardware realization of some of the lesser complex motion estimation algorithms. Progress in VLSI chip implementation of some of these algorithms is reported in the technical literature (see, e.g., T. Komarek and P. Pirsch, "Array Architectures for Blockmatching," pp. 1301-1308; K.-M. Yang, M.-T. Sun, and L. Wu, "A Family of Designs for Motion Compensation Block-Matching Algorithm", pp. 1317-1325; L. Devos and M. Stegherr, "Parameterizable VLSI Architectures for the Full-Search Block-matching Algorithms," pp. 1309-1316; C.-H. Chou and Y.-C. Chen, "A VLSI Architecture for Real-Time and Flexible Image Template Matching," pp. 1336-1342; and R. C. Kim and S. U. Lee, "A VLSI Architecture for Pel Recursive Motion Estimation Algorithm," pp. 1291-1300, all from *IEEE Trans. on Circuits and Systems*, special issue on VLSI Implementation for Digital Image and Video Applications, Vol, 36, October, 1989).

Various methods of block-matching estimation have been proposed. For example, block-matching motion estimation with a means absolute difference criterion (see, e.g. T. Koga, I, Iinuma, A. Hirano, Y. Iiyima, and T. Ishiguro, "Motion-Compensated Interframe Coding for Video Conferencing," *Proc. of the NTC* 81, pp. G5.3.1-G5.3.5, New Orleans, La., December 1981) is a candidate for low bit rate video application due mainly to its relative ease of hardware implementation. Its performance, however, may be less than satisfactory for fast moving video sequences or in the presence of noise. More efficient criteria such as cross-correlation and mean squared difference (see, e.g., S. Kappagantula and K. R. Rao, "Motion Compensated Predictive Coding," *SPIE*, 27th Proc. 432, pp. G4-70, 1983) are too complex and their hardware requirement is too difficult for practical realization.

An objective of the present invention is to realize maximize performance by a block-matching motion estimation procedure that requires minimum of hardware complexity.

SUMMARY OF THE INVENTION

The block-matching motion estimation procedure of the present invention estimates, as in the prior art, the motion vector for each block of picture elements (pels) in the current coding frame. As in the prior art, it is assumed that all the pels within each non-overlapping block have the same motion displacement vector. Furthermore, as in the prior art, the motion vector for each block is estimated by searching through a larger block (the search window), centered at the same location on the previous coding frame, for the best match. In accordance with the present invention, a pel-by-pel comparison is made between the intensity of the pels in the block in the current frame and corresponding pels in a block in the previous frame for each possible shift position of the block within the search window. Depending on these pel differences and a selected threshold, each pel in the block is classified as either matching pel or a mismatching pel. The number of matching pels which exist between the current block and the block in the previous reference frame at each possible shift position is then determined. The block in the previous frame at the shift position that yields the maximum number of matching pels determines the components of the motion vector for the block in the current frame.

DETAILED DESCRIPTION

Figure 1:
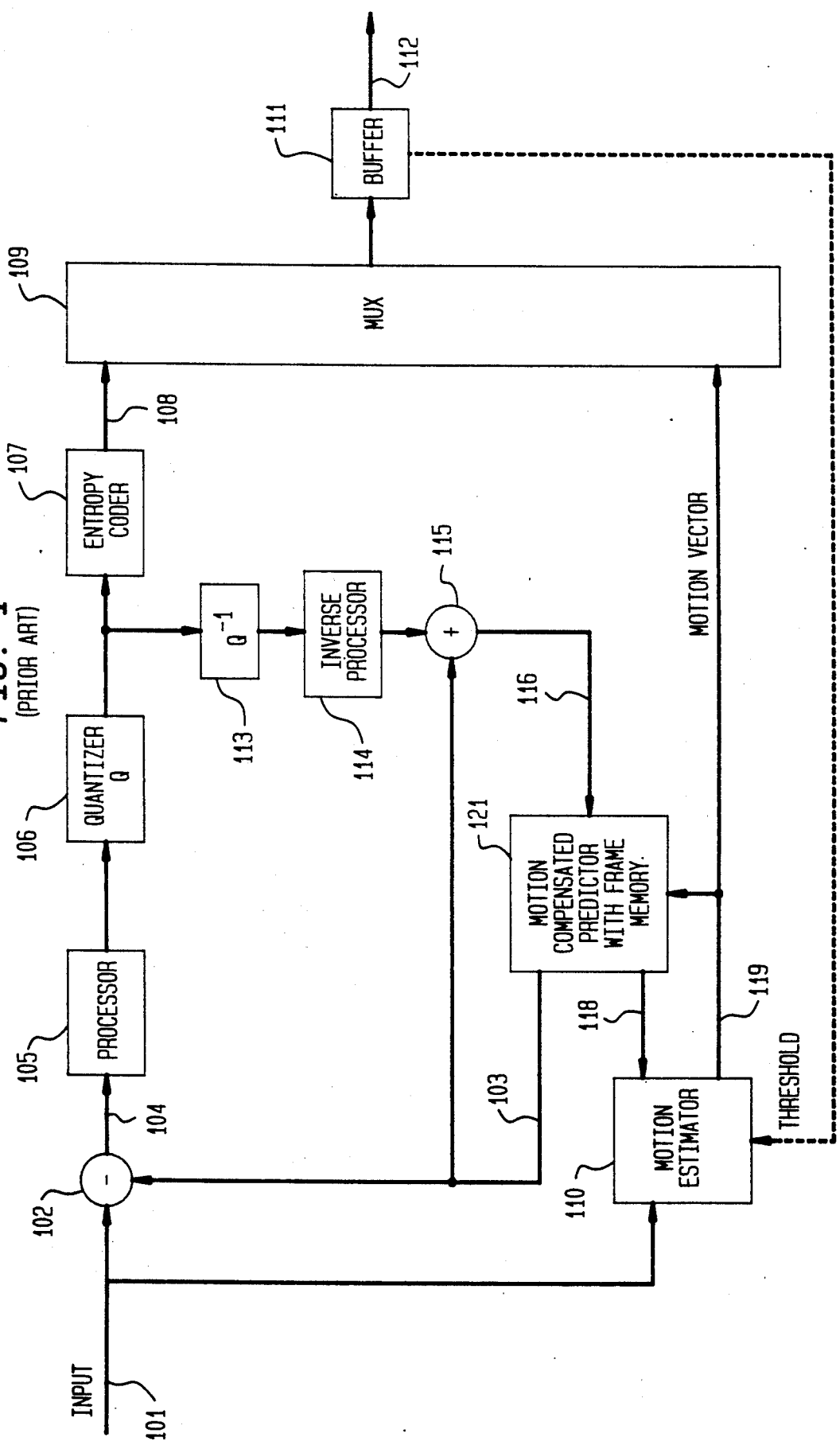
FIG. 1 is a block diagram of a prior art video coder that employs the block-matching motion estimator of the present invention.

With reference to FIG. 1, a prior art video encoder is shown which employs the block-matching motion estimator of the present invention. The input video pels of the current frame are input over lead 101 to a subtracter 102 in either block format or consecutively depending on the coding processor of the encoder, to be described hereinafter. Subtracter 102 subtracts a predicted pel value (or values) on lead 103 from the pel (or pels) of the current frame. The predicted pel value (or values) on lead 103 is that pel (or those pels) from the previous video frame as displaced by the estimate of the horizontal and vertical translation of what has been determined to best correspond with that pel (or pels) in the previous frame. This same motion vector is applied to all the pels within a block of input pels regardless of whether the input is being processed sequentially or in blocks of the same or other size. As will be described hereinafter, each of the predicted pel values on lead 103 is output by a motion compensated predictor 121, which incorporates a frame memory, and which is controlled by the motion estimator 110 of the present invention. The resultant differential pels on lead 104 are processed by a video processor 105. Processor 105 can perform, for example, a discrete-cosine transformation or a two-dimensional subband decomposition on its input differential pels. For the former of these cases, the input pels are processed in block format. Alternatively, if the encoder performs direct DPCM coding then processor need not be part of the encoder. In the case of direct DPCM coding, and for two-dimensional subband decomposition processing, the input pels are processed sequentially across each scan line and down each frame. The transformed, decomposed, or direct differential pel elements are then quantized by quantizer 106 and the quantized elements are coded by an entropy coder 107 using, for example, a combination of run-length and variable-length coding. The entropy coded bit stream for the current video frame on lead 108 is multiplexed by multiplexer 109 with the motion vectors estimated by motion estimator 110 for each of the blocks of pels of the current frame. The multiplexed bit stream is input to a buffer 111 for subsequent transmission at a constant rate onto transmission channel 112.

At the same time the quantized transformed, decomposed, or direct differential elements at the output of quantizer 106 are being coded by entropy coder 107, these elements are converted by inverse quantizer 113 and inverse processor 114 back into coded differential pel values. The coded differential pel values at the output of inverse processor 114 are added by adder 115 to the motion compensated predicted values on output 103 of motion compensated predictor 121 to form a reconstructed signal on lead 116 of actual coded pel values. These coded pel values on lead 116 are input to predictor 121 for storage in the frame memory for subsequent processing of the next frame.

The inputs to motion estimator 110 are the pel values of the current frame from input 101 and the pels values of the previous coded frame stored in the frame memory of predictor 121 and input to estimator 110 over lead 118. Motion estimator 110, to be described in detail hereinafter, performs block-matching motion estimation. Specifically, estimator 110 compares each nonoverlapping block of input pels from input 101 and compares these input pel values with the pel values in a larger search window of coded pel values from the previous frame which are stored in the frame memory of predictor 121. This larger search window is centered at the same location as the input block on the previous coded frame.

Figure 2:
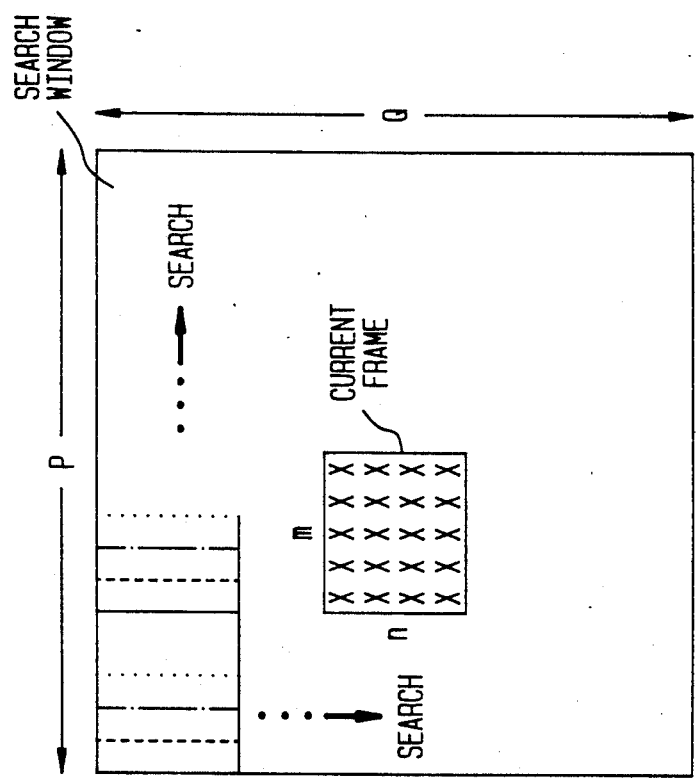
FIG. 2 shows an example of a block of pels from a current frame within a larger search window of a previous frame.

FIG. 2 shows an m×n sized block of pels from the current input frame centered within a larger search window of P×Q coded pels within the previous frame. As will be described, comparisons are made between the pel values in the input block of the current frame and the coded pel values from the previous frame as the input block is swept through the search window starting at the upper left-most position moving horizontally one pel position at a time, and then vertically down through the search window moving one scan line at a time, until finally reaching the lower right-most position within the search window. The horizontal and vertical displacements from the nominal "no motion" central position within the search window that yields the best match between the block from the current frame and the coded pels from the previous frame determines the components of the estimated motion vector for that input block.

With reference again to FIG. 1, this motion vector is output on lead 119 to predictor 121. For each pel within the block having the same motion vector, predictor 121 uses that vector to determine the addresses within its frame memory to obtain the predicted pel values to be output on lead 103 to subtracter 102. These same predicted pel values on lead 103 are also added by adder 115 to the inverse quantized and processed differential values at the output of inverse processor 114 to produce the actual coded pel values on lead 116 that are stored in the frame memory of predictor 121 for processing of the next frame.

As previously noted, multiplexer 109 multiplexes the output of entropy coder 107 and the motion vectors produced by estimator 110 for transmission over transmission channel 112 to a decoder (not shown). The decoder includes circuitry of a type similar to that within the feedback loop of the encoder: an inverse quantizer, a inverse processor, a predictor with a frame memory and an adder. For each received block of pel data, the inversely quantized and processed differential pel values are added to the predicted pel values from the previous frame as determined by the received motion vector for that block.

In accordance with the block-matching estimation procedure of the present invention, each pel in the block of the current frame is compared with a positionally corresponding pel in a block in the previous frame and classified as either a matching pel or a mismatching pel. This classification is performed by comparing the intensity of the pel, $S_f(k,l)$, in the block in the current frame, f, with the intensity of the pel, $S_{f-1}(k+i,l+j)$, in the previous coding frame, $f-1$, as shifted by i pels and j lines (in the scanning directions). A threshold t is selected to perform the classification of each pel as a matching or mismatching pel:

$$T(k,l,i,j) = 1 \text{ if } |S_f(k,l) - S_{f-1}(k+i,l+j)| \leq t \qquad (1)$$
$$= 0 \text{ otherwise}$$

$T(k,l,i,j)$ is the binary representation of the pel difference and its value of one or zero corresponds to a matching or mismatching pel, respectively. For a given motion displacement of i pels and j lines, the measure of matching is determined by $G(i,j)$ as follows:

$$G(i,j) = \sum_k \sum_l T(k,l,i,j) \qquad (2)$$

The values of $G(i,j)$ represents the number of matching pels which exist between the current block and the block on the previous frame shifted by the i pels and j lines. Throughout the search within the search window (i.e., $i=0, \pm 1, \pm 2, \ldots$ and $j=0, \pm 1, \pm 2, \ldots$) the largest $G(i,j)$ represents the best match. Thus, $$G(\bar{d}_h,\bar{d}_v) = \max_{i,j}\{G(i,j)\} \qquad (3)$$

where $\bar{d}_h$ and $\bar{d}_v$ are the horizontal and vertical components of the displacement.

Figure 3:
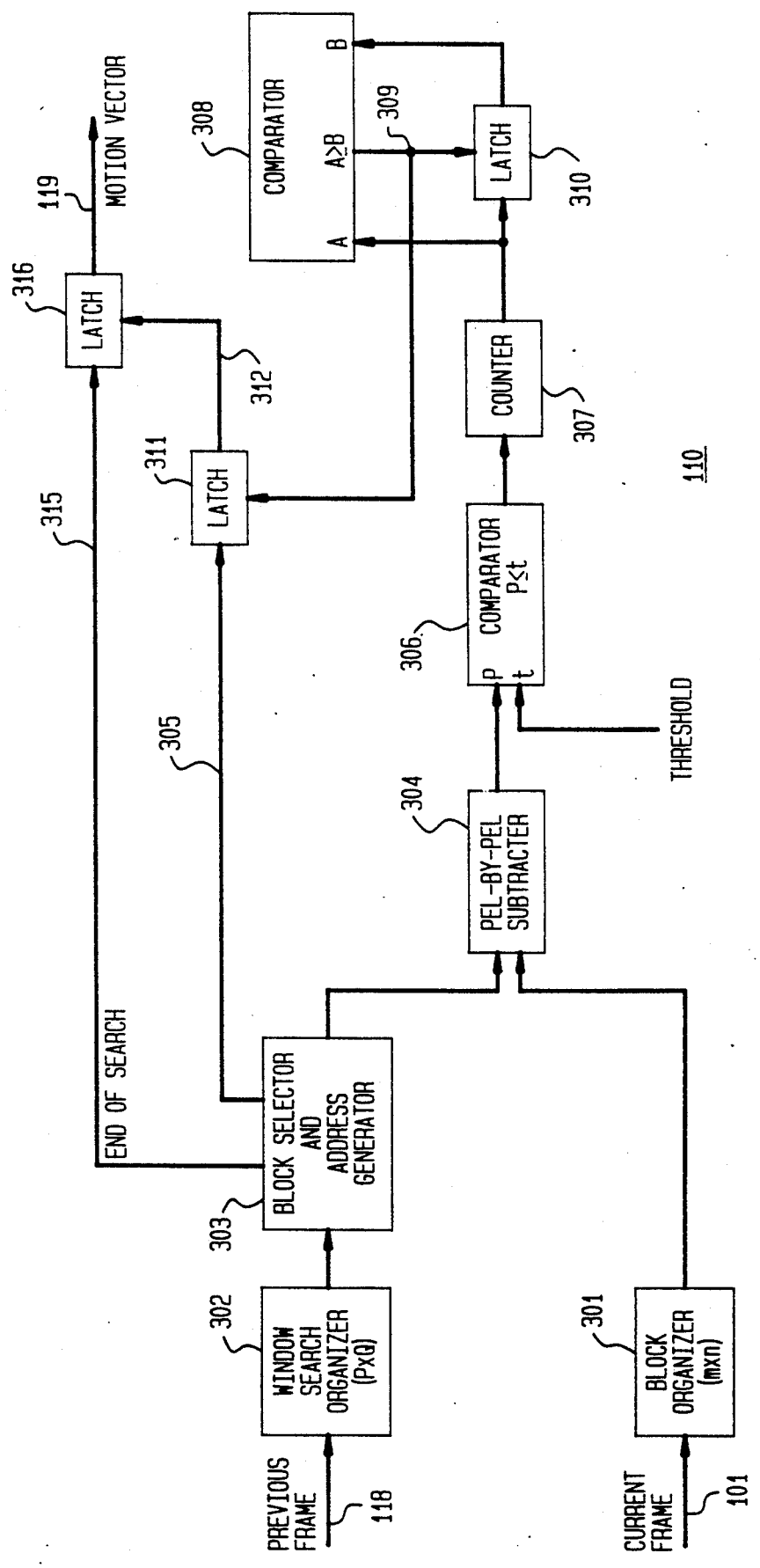
FIG. 3 is a block diagram of the block-matching motion estimator of the present invention.

FIG. 3 is a block diagram of the motion estimator 110 of the present invention, which functionally performs the above-described procedure. Similar numerical designations are given to those elements common in both FIGS. 1 and 3. The pels of the current frame are input into the motion estimator 110 over lead 101 to a block organizer 301 which organizes the input frame into nonoverlapping m×n sized blocks of the pel data. Coded pel values from the previous frame that are stored in the frame memory of the motion compensated predictor 121 of the coder in FIG. 1 are input to the motion estimator 110 over lead 118 to window search organizer 302 which organizes the previous frame into P×Q sized search windows positionally surrounding and corresponding to each m×n block of pel values produced by block organizer 301. Starting at the left upper-most corner of the search window, block selector and address generator 303 outputs an m×n subblock of coded pel values from the search window of the previous frame to pel-by-pel subtracter 304. The address of each subblock relative to the position of the block of pel values from the current frame is also output onto lead 305. Pel-by-pel subtracter 304 subtracts the intensity values of each pel in the m×n block in the current frame from the intensity values of the corresponding pels in the particular subblock of the search window in the previous frame to which the block in the current frame is being compared. Comparator 306 compares the absolute value of each individual pel difference, P, with the threshold t and produces a pulse output for each pel comparison in which P≦t, wherein each pulse indicates a matching pel. Counter 307 counts the number of matching pels and produces an output, A, equal to the that number. Comparator 308 compares that number, A, with a stored number, B, of matching pels determined from a previous comparison of this same block within the current frame with a positionally different subblock within the same search window of the previous frame. If A≧B, then comparator outputs a pulse on lead 309 to latch 310 which latches that output A of counter 307 to the B input of comparator 308, thereby replacing the previously stored number of matching pels with a new higher number of matching pels. If A≧B, the address on leads 305 of the current subblock is also latched by latch 311 to leads 312. If A<B, then the present value of B remains stored in comparator 308, and the address of the previously determined subblock with a higher number of matching pels remains on leads 312. It is apparent, therefore, that the address of the subblock in the search window with the maximum number of matching pels always remains on leads 312 as the current block is compared with each possible subblock within the search window. Accordingly, after block selector and address generator outputs the last subblock at the lower far-right corner of the search window, an end-of-search signal is produced on lead 315 for input to latch 316. this signal thus latches the address of the subblock with the highest number of matching pels to output leads 119 and represents the motion vector associated with the input block.

As described above, block-matching is effected by determining the subblock within the search window having the maximum number of matching pels. Block-matching could alternatively and equivalently be effected by determining the subblock within the search window having the minimum number of mismatching pels. Accordingly, comparator 306 would produce an output for each mismatching pel (P>t) and comparator 308 would determine whether the output of counter 307 was less than the subblock (A<B) within the window having the previously determined lowest number of mismatching pels.

As described hereinabove, the threshold input t to comparator 306 has been assumed to be a fixed predetermined threshold value for pel comparison. Alternatively, threshold t can be made adaptive to the occupancy level of the buffer 111 in FIG. 1. This adaptation can be on a frame-by-frame basis where the threshold t is fixed during a one frame period. Its value, therefore, is set in accordance with the motion activities which have been registered by the buffer during the last coding frame. The adaptive thresholding can also be extended to work on a block-by-block (or group of blocks) basis. With reference to FIG. 1 again, a dotted lead 125 is shown connecting buffer 111 to the threshold input of motion estimator 110 to indicate the adaptiveness of the threshold to the buffer fullness.

The above-described embodiment is illustrative of the principles of the present invention. Other embodiments could be devised by those skilled in the art without departing from the spirit and scope of the present invention.

What is claimed is:

1. A method of estimating the frame-to-frame motion of a block of pels in a video frame comprising the steps of:
   (a) comparing the pels in the block in a current frame with pels in a corresponding block in a previous frame;
   (b) determining from each comparison whether each pel is a matching pel or a mismatching pel;
   (c) counting the number of matching pels or the number of mismatching pels;
   (d) repeating steps (a) through (c) for a predetermined number of blocks that surround the corresponding block in the previous frame; and
   (e) estimating the relative motion of the block between its position in the current frame and its position in the previous frame in response to the position of the block in the previous frame at which the number of matching pels is highest or the number of mismatching pels is lowest.

2. A method of estimating the frame-to-frame motion of a block of pels in a video frame comprising the steps of:
   (a) comparing the pels in the block in a current frame with pels in a block within a search window in a previous frame that surrounds the position of the block in the current frame;
   (b) determining from each comparison whether each pel is a matching pel or a mismatching pel;
   (c) counting the number of matching pels or the number of mismatching pels;
   (d) repeating steps (a) through (c) for each block within the search window in the previous frame; and
   (e) estimating the relative motion of the block between its position in the current frame and its position in the previous frame in response to the position of the block in the previous frame at which the number of matching pels is highest or the number of mismatching pels is lowest.

3. A method of estimating the frame-to-frame motion of a block of pels in a video frame comprising the steps of:
- (a) comparing the intensity of the pels in the block in the current frame with the intensity of pels in a block within a search window in a previous frame that surrounds the position of the block in the current frame;
- (b) determining that each pel is a matching pel if the difference between intensities is less or equal to a threshold and is a mismatching pel if the difference is greater than a threshold;
- (c) counting the number of matching pels or the number of mismatching pels;
- (d) repeating steps (a) through (c) for each block within the search window in the previous frame; and
- (e) estimating the relative motion of the position of the block in the current frame from its position in the previous frame in response to the position of the block in the previous frame at which the number of matching pels is highest or the number of mismatching pels is lowest.

4. The method of claim 3 wherein the threshold is a predetermined value.

5. The method of claim 3 wherein the threshold is determined by the fullness of a buffer which stores the coded differences between the intensities of the pels in the block in the current frame and the intensities of the pels in the particular block in the previous frame at which the number of matching pels has been determined to be highest or the number of mismatching pels has been determined to be the lowest.

6. Apparatus in a video coder for estimating the frame-to-frame motion of a block of pels in a video frame comprising:
- means for pel-by-pel comparing the pels in the block in the current frame and the pels in a block in a previous frame;
- means for determining from each comparison whether each pel is a matching pel or a mismatching pel;
- means for counting the number of matching pels or the number of mismatching pels;
- means for selecting another block of pels in the previous frame for pel-by-pel comparison with the block in the current frame; and
- means for estimating the relative motion of the position of the block in the current frame from its position in the previous frame in response to the block in the previous frame at which the number of matching pels is highest or the number of mismatching pels is lowest.

7. Apparatus in a video coder for estimating the frame-to-frame motion of a block of pels in a video frame comprising:
- means for forming a search window in a previous frame that surrounds the position of the block of pels in the current frame for which motion it to be estimated;
- means for pel-by-pel comparing the pels in the current frame with pels in a block within said search window in the previous frame;
- means for determining from each comparison whether each pel is a matching pel or a mismatching pel;
- means for counting the number of matching pels or the number of mismatching pels;
- means for selecting another block of pels within the search window for pel-by-pel comparisons; and
- means for estimating the relative motion of the block in the current frame from its position in the previous frame in response to the block in the previous frame in the search window at which the number of matching pels is highest or the number of mismatching pels is lowest.

8. Apparatus in a video coder for estimating the frame-to-frame motion of a block of pels in a video frame comprising:
- means for forming a search window in a previous frame that surrounds the block of pels in the current frame for which motion is to be estimated;
- means for pel-by-pel comparing the intensity of the pels in the block in the current frame and the intensity of pels in a block within the search window in the previous frame;
- means for determining from each comparison that a pel is a matching pel if the difference between intensities is less than or equal to a threshold and is a mismatching pel if the difference is greater than said threshold;
- means for counting the number of matching pels or the number of mismatching pels;
- means for selecting another block of pels within the search window for pel-by-pel comparisons; and
- means for estimating the relative motion of the block in the current frame from its position in the search window in the previous frame in response to the block within the search window at which the number of matching pels is highest or the number of mismatching pels is lowest.

9. Apparatus in accordance with claim 8 wherein said threshold is a constant.

10. Apparatus in accordance with claim 8 wherein said threshold is adjustable.

11. A video encoder comprising
- motion estimating means for generating estimates of the frame-to-frame motion of each block of input pels in a current video frame;
- video coding means for coding the differences between the input pels in the current video frame and motion compensated pels from a previous frame; and
- multiplexing means for multiplexing these coded pel differences and the estimates of the frame-to-frame motion of each block of input pels from the current video frame; wherein said motion estimating means comprises
  - means for forming for each block of input pels a corresponding search window in a previous frame that surrounds the position of the block of input pels;
  - means for pel-by-pel comparing the intensities of the pels in one input block in the current frame with the intensities of the pels in a block within the corresponding search window in the previous frame;
  - means for determining from each comparison that each pel is a matching pel if the difference between intensities is less than or equal to a threshold and is a mismatching pel if the difference is greater than said threshold;
  - means for counting the number of matching pels or the number of mismatching pels;

means for selecting another block of pels within that same search window for pel-by-pel comparisons; and means for estimating the relative motion of the input block in the current frame from its position within its corresponding search window in the previous frame in response to the block in the previous frame at which the number of matching pels is highest or the number of mismatching pels is lowest.

12. A video encoder in accordance with claim 11 wherein said threshold is a predetermined constant.

13. A video encoder in accordance with claim 11 further comprising buffer means connected to the output of said multiplexer.

14. A video encoder in accordance with claim 13 where said threshold is determined by the fullness of said buffer means.

* * * * *